United States Patent
Groninga et al.

(10) Patent No.: US 10,513,334 B2
(45) Date of Patent: Dec. 24, 2019

(54) X-TILTWING AIRCRAFT

(71) Applicant: Textron Innovations Inc., Providence, RI (US)

(72) Inventors: Kirk Landon Groninga, Fort Worth, TX (US); Daniel Bryan Robertson, Fort Worth, TX (US)

(73) Assignee: Textron Innovations Inc., Providence, RI (US)

( * ) Notice: Subject to any disclaimer, the term of this patent is extended or adjusted under 35 U.S.C. 154(b) by 368 days.

(21) Appl. No.: 15/619,765

(22) Filed: Jun. 12, 2017

(65) Prior Publication Data
US 2018/0354615 A1 Dec. 13, 2018

(51) Int. Cl.
*B64C 29/00* (2006.01)
*B64C 39/08* (2006.01)
*B64D 27/24* (2006.01)
*B64C 15/12* (2006.01)
*B64D 27/02* (2006.01)
(Continued)

(52) U.S. Cl.
CPC .......... *B64C 29/0033* (2013.01); *B64C 3/385* (2013.01); *B64C 15/12* (2013.01); *B64C 27/28* (2013.01); *B64C 39/08* (2013.01); *B64D 27/24* (2013.01); *B64D 2027/026* (2013.01)

(58) Field of Classification Search
CPC ..... B64C 29/0033; B64C 15/12; B64C 39/08; B64D 27/24; B64D 2027/026; B64D 35/06
See application file for complete search history.

(56) References Cited

U.S. PATENT DOCUMENTS

| | | |
|---|---|---|
| 8,616,492 B2 | 12/2013 | Oliver |
| 8,820,672 B2 | 9/2014 | Erben et al. |
| 8,909,391 B1 | 12/2014 | Peeters et al. |

(Continued)

FOREIGN PATENT DOCUMENTS

| | | |
|---|---|---|
| CN | 205440867 U | 8/2016 |
| WO | 2016135697 A1 | 9/2016 |

OTHER PUBLICATIONS

Air Launched Unmanned Disaster Relief Delivery Vehicle, 33rd Annual AHS Student Design Competition, University of Maryland, Undated but admitted prior art.

(Continued)

*Primary Examiner* — Rodney A Bonnette
(74) *Attorney, Agent, or Firm* — Lawrence Youst PLLC

(57) ABSTRACT

An aircraft having a vertical takeoff and landing flight mode and a forward flight mode. The aircraft includes a fuselage and an X-tiltwing that is rotatable relative to the fuselage between a vertical lift orientation and a forward thrust orientation. The X-tiltwing has oppositely disposed V-wing members each having first and second wing sections. In the vertical lift orientation, the first and second wing sections of each V-wing member are generally in the same horizontal plane. In the forward thrust orientation, the first and second wing sections of each V-wing member are generally in the same vertical plane. A distributed propulsion system is attached to the X-tiltwing such that a plurality of propulsion assemblies is attached to each wing section. A flight control system is operably associated with the distributed propulsion system to independently control each of the propulsion assemblies.

20 Claims, 12 Drawing Sheets

(51) Int. Cl.
    *B64C 27/28*    (2006.01)
    *B64C 3/38*     (2006.01)

(56) References Cited

U.S. PATENT DOCUMENTS

| | | | |
|---|---|---|---|
| 8,948,935 | B1 | 2/2015 | Peeters et al. |
| 9,087,451 | B1 | 7/2015 | Jarrell |
| 9,127,908 | B2 | 9/2015 | Miralles |
| 9,162,753 | B1 | 10/2015 | Panto et al. |
| 9,193,460 | B2 | 11/2015 | Laudrain |
| 9,221,538 | B2 | 12/2015 | Takahashi et al. |
| 9,284,049 | B1 | 3/2016 | Wang et al. |
| 9,321,530 | B2 | 4/2016 | Wang et al. |
| 9,403,593 | B2 | 8/2016 | Downey et al. |
| 9,463,875 | B2 | 10/2016 | Abuelsaad et al. |
| 2011/0042509 | A1 | 2/2011 | Bevirt et al. |
| 2015/0014475 | A1 | 1/2015 | Taylor et al. |
| 2018/0002009 | A1* | 1/2018 | McCullough .......... B64D 35/00 |
| 2018/0002011 | A1* | 1/2018 | McCullough ....... B64C 29/0033 |
| 2018/0002015 | A1* | 1/2018 | McCullough .......... B64C 29/02 |
| 2018/0002016 | A1* | 1/2018 | McCullough .......... B64C 29/02 |
| 2018/0044011 | A1* | 2/2018 | Reichert ................ B64C 11/28 |

OTHER PUBLICATIONS

European Search Report; Application No. 181670373; European Patent Office; dated Jul. 3, 2018.

* cited by examiner

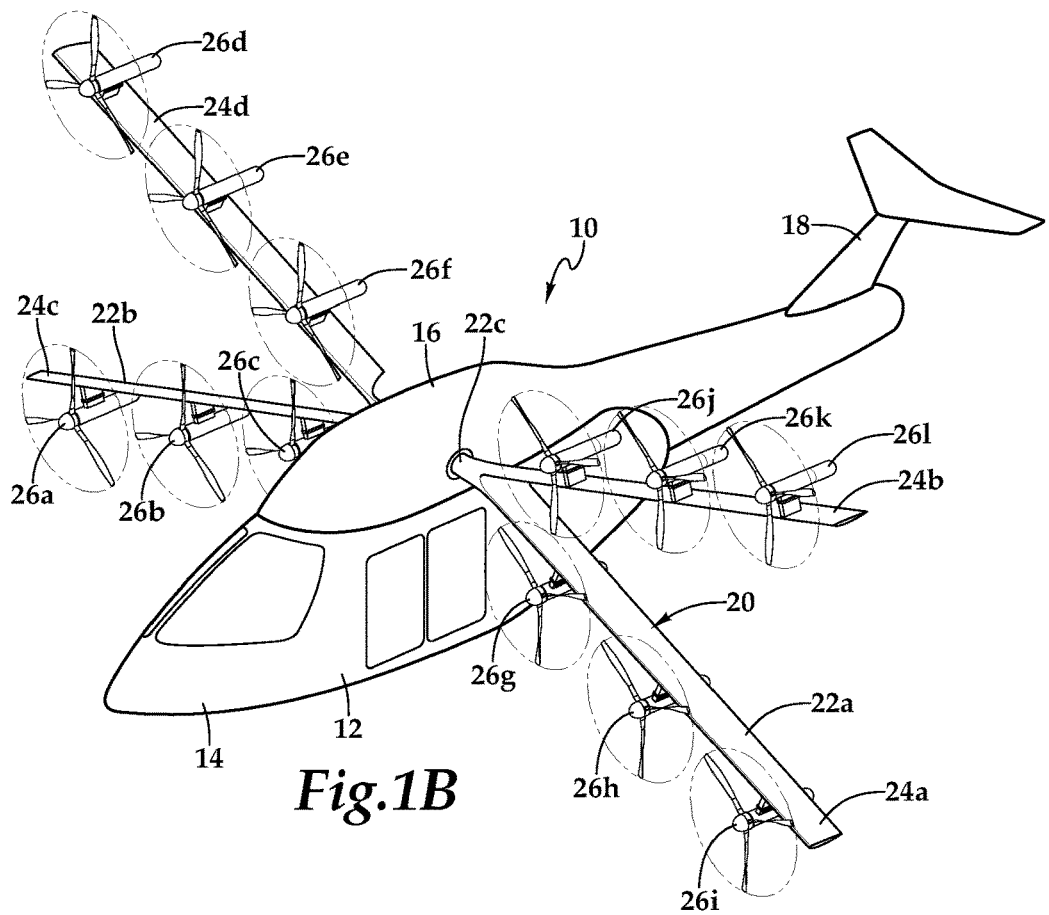
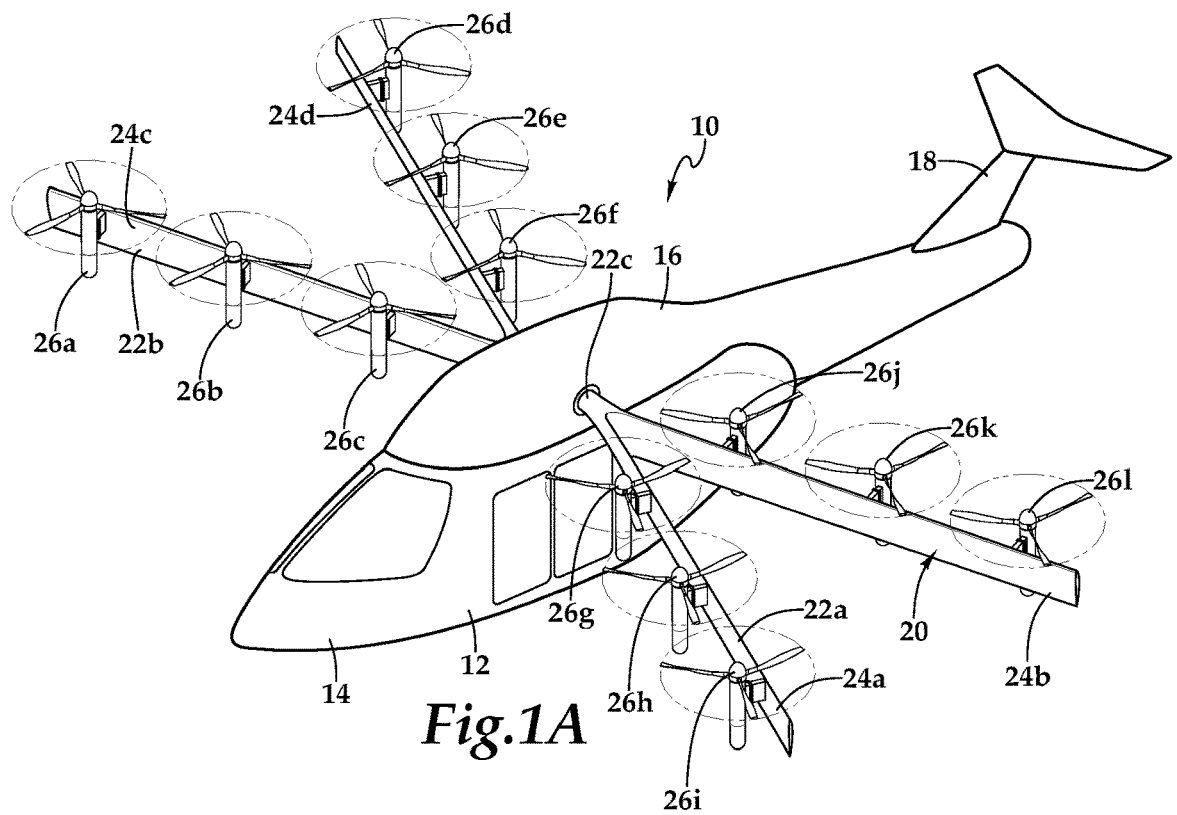

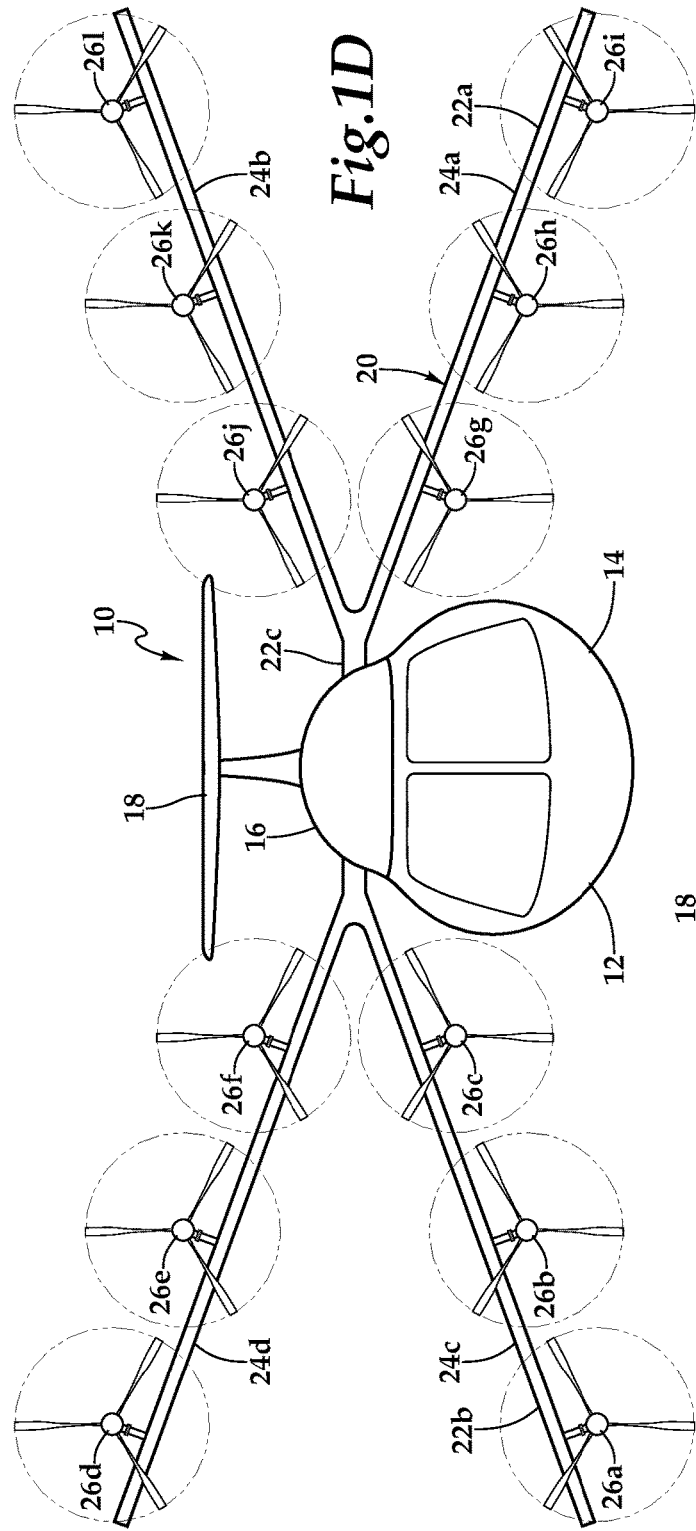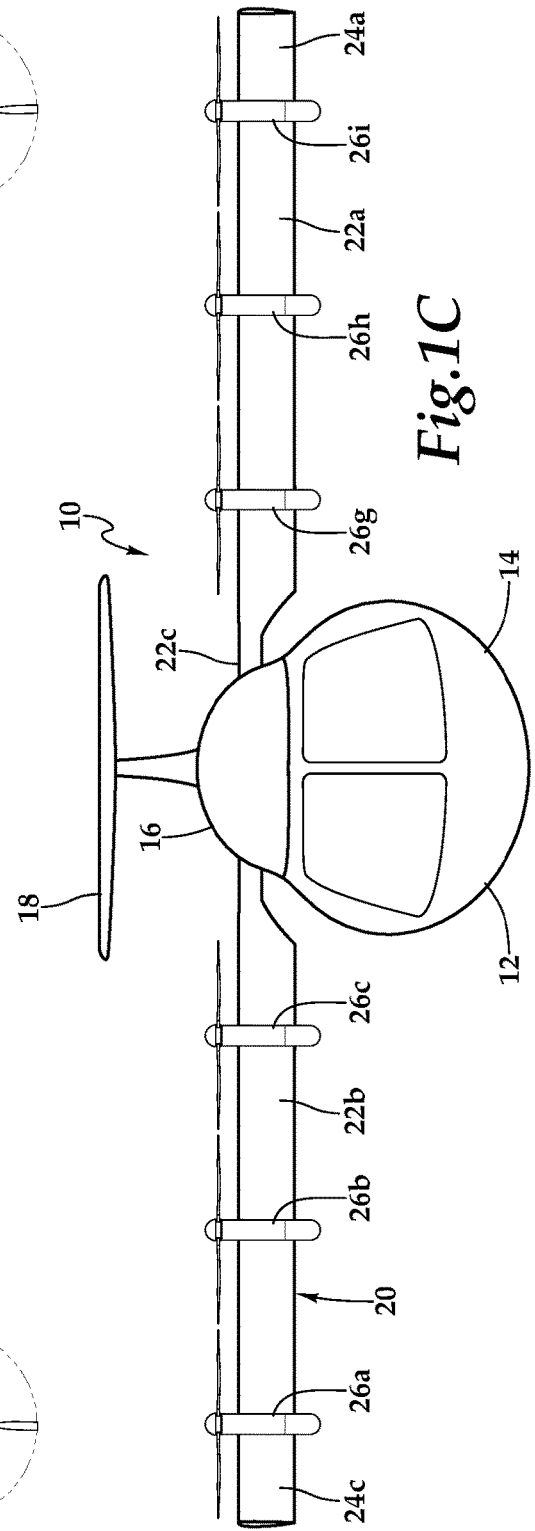

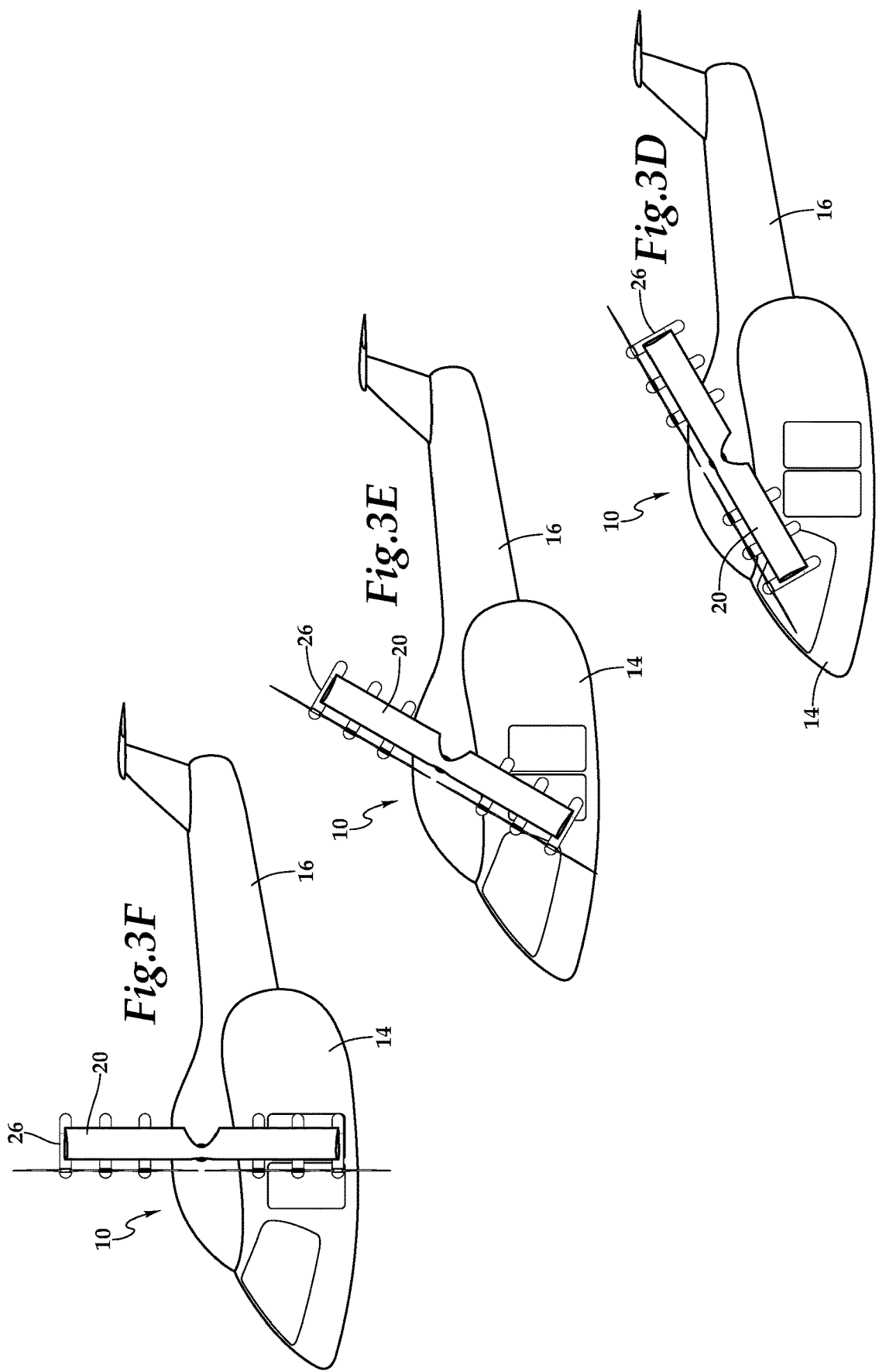

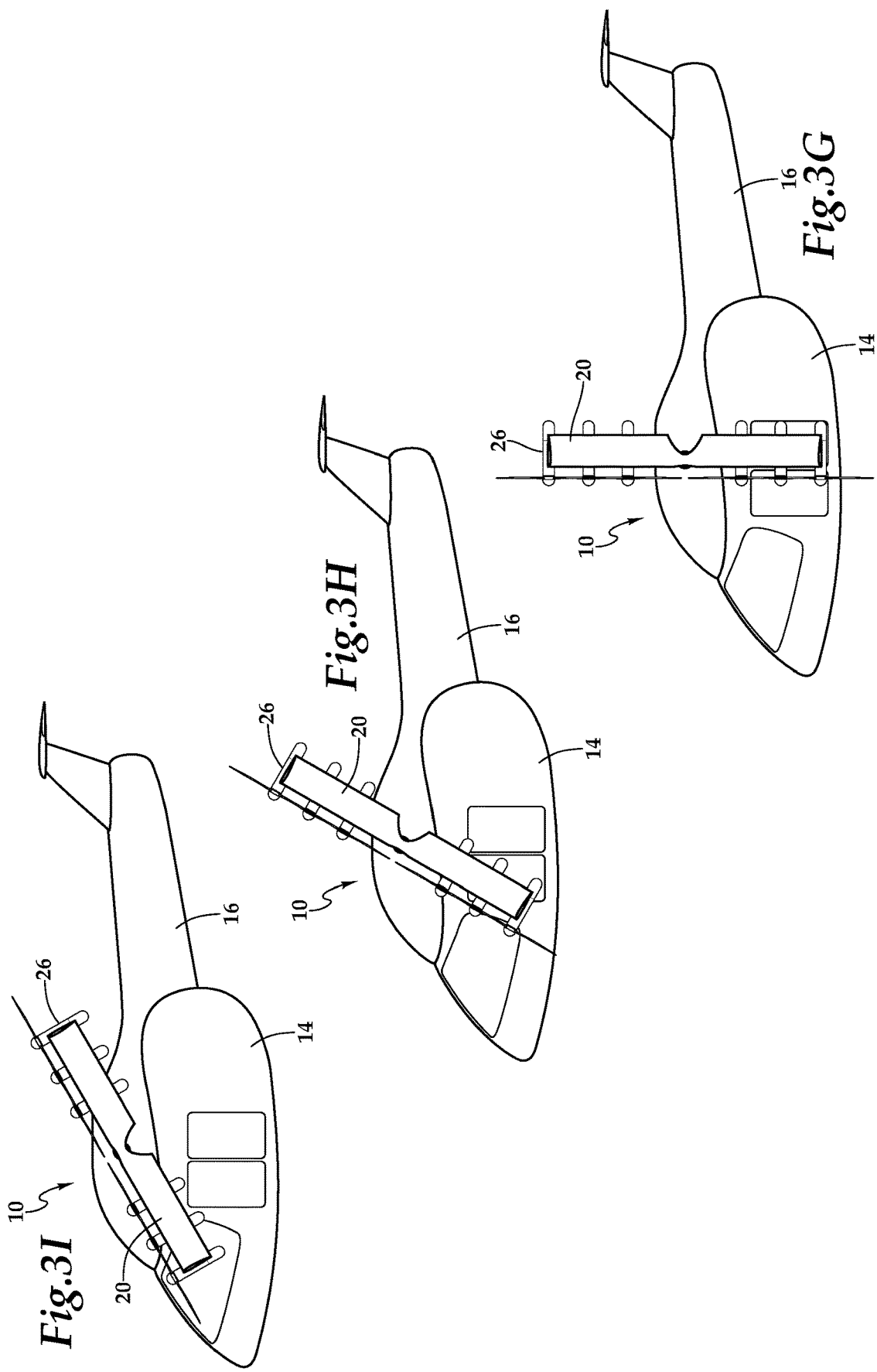

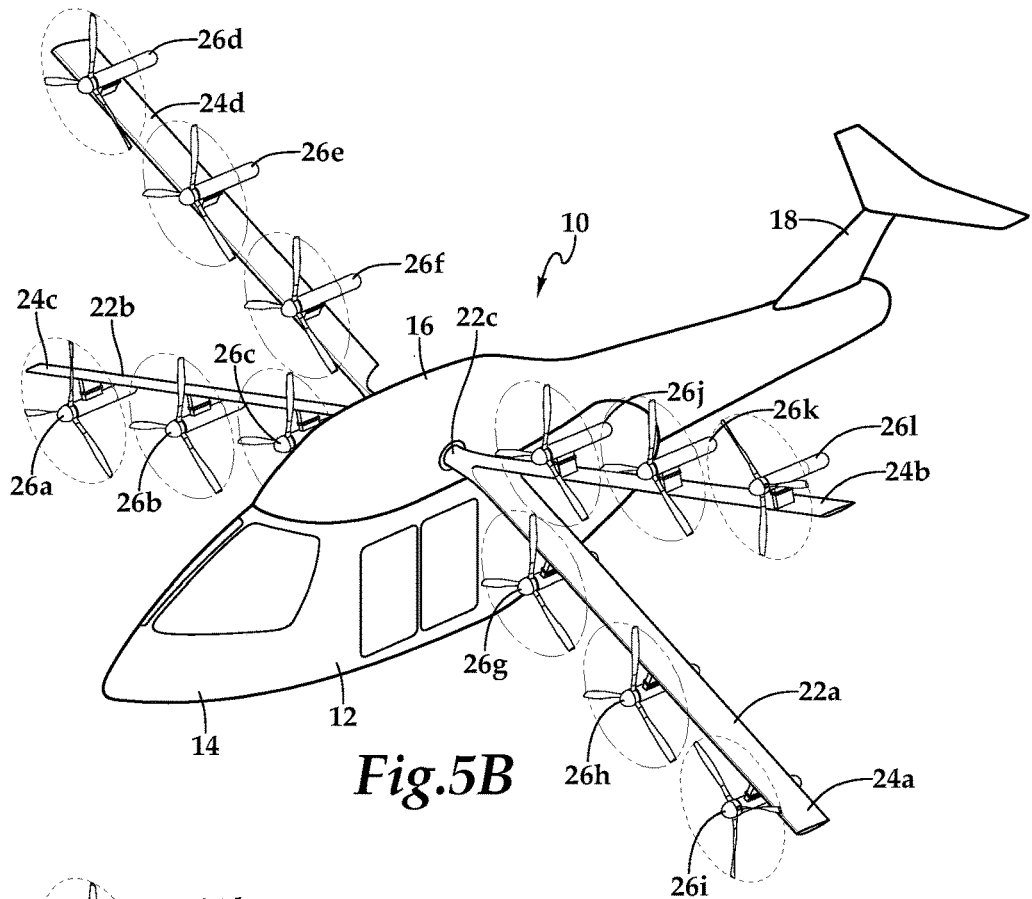
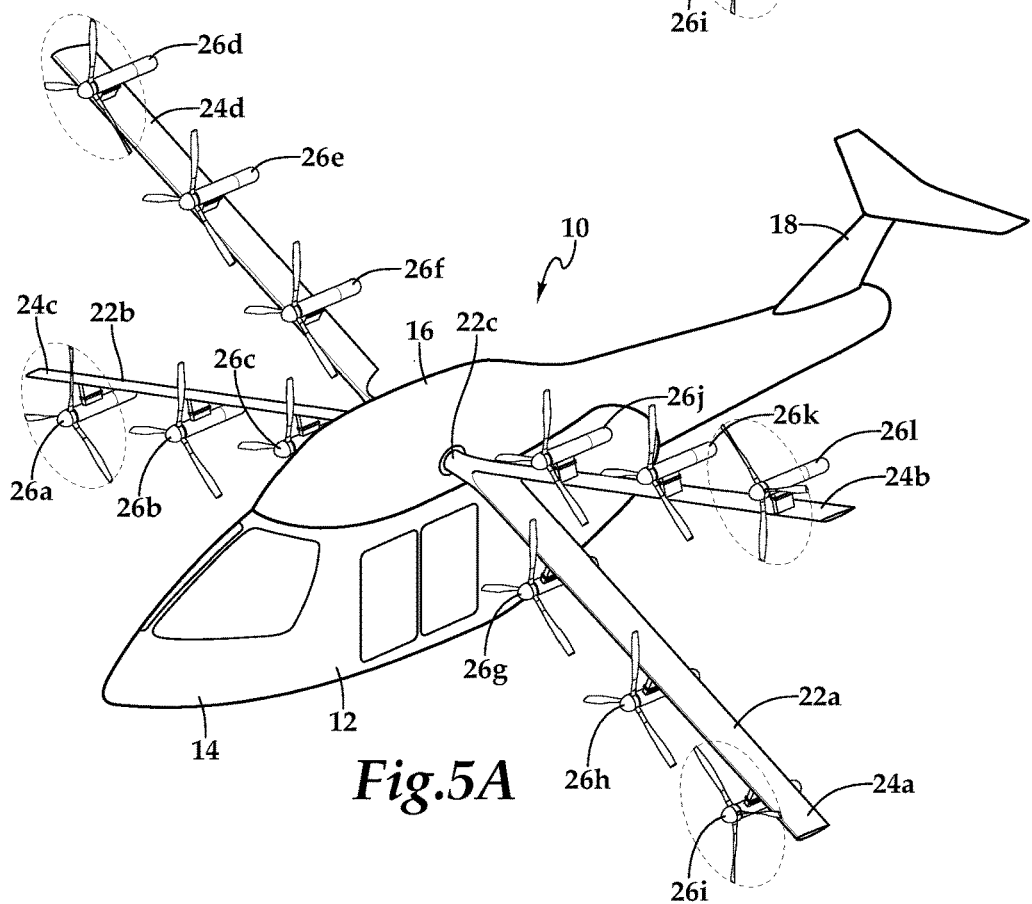

X-TILTWING AIRCRAFT

TECHNICAL FIELD OF THE DISCLOSURE

The present disclosure relates, in general, to aircraft operable to transition between a forward flight mode and a vertical takeoff and landing flight mode and, in particular, to an X-tiltwing aircraft having a distributed propulsion system operated responsive to autonomous flight control, remote flight control, onboard pilot flight control and/or combinations thereof.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the airplane in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of VTOL aircraft is a helicopter which is a rotorcraft having one or more rotors that provide lift and thrust to the aircraft. The rotors not only enable hovering and vertical takeoff and landing, but also enable, forward, backward and lateral flight. These attributes make helicopters highly versatile for use in congested, isolated or remote areas where fixed-wing aircraft may be unable to takeoff and land. Helicopters, however, typically lack the forward airspeed of fixed-wing aircraft.

A tiltrotor aircraft is another example of a VTOL aircraft. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation for vertical takeoff, hovering and landing and a generally vertical plane of rotation for forward flight, wherein the fixed wing provides lift and the proprotors provide forward thrust. In this manner, tiltrotor aircraft combine the vertical lift capability of a helicopter with the speed and range of fixed-wing aircraft. Tiltrotor aircraft, however, typically suffer from downwash inefficiencies during vertical takeoff and landing due to interference caused by the fixed wing.

A further example of a VTOL aircraft is a tiltwing aircraft that features a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight. The tiltwing design enables the slipstream from the propellers to strike the wing on its smallest dimension, thus improving vertical thrust efficiency as compared to tiltrotor aircraft. Tiltwing aircraft, however, are more difficult to control during hover as the vertically tilted wing provides a large surface area for crosswinds typically requiring tiltwing aircraft to have either cyclic rotor control or an additional thrust station to generate a moment.

SUMMARY

In a first aspect, the present disclosure is directed to an aircraft having a vertical takeoff and landing flight mode and a forward flight mode. The aircraft includes a fuselage and an X-tiltwing that is rotatable relative to the fuselage between a vertical lift orientation and a forward thrust orientation. The X-tiltwing has oppositely disposed V-wing members each having first and second wing sections. In the vertical lift orientation, the first and second wing sections of each V-wing member are generally in the same horizontal plane. In the forward thrust orientation, the first and second wing sections of each V-wing member are generally in the same vertical plane. A distributed propulsion system is attached to the X-tiltwing such that a plurality of propulsion assemblies is attached to each wing section. A flight control system is operably associated with the distributed propulsion system to independently control each of the propulsion assemblies.

In some embodiments, each of the propulsion assemblies may include a nacelle operable to be coupled to the X-tiltwing, an electric motor disposed within the nacelle, a rotor hub mechanically coupled to the electric motor and operable to rotate responsive to operation of the electric motor and a proprotor mechanically coupled to the rotor hub and operable to rotate therewith. In certain embodiments, an electrical energy generation system may be disposed within the fuselage to provide electrical energy to each of the propulsion assemblies. In such embodiments, the electrical energy generation system may include at least one internal combustion engine and an electric generator. Also, in such embodiments, each of the propulsion assemblies may include at least one battery disposed within the nacelle that is charged by the electrical energy generation system.

In some embodiments, each of the propulsion assemblies may be a line replaceable unit. In certain embodiments, each of the propulsion assemblies may include an electronics node in communication with the flight control system that is operable to control operations of the respective propulsion assembly. In some embodiments, the flight control system may be a redundant flight control system or a triply redundant flight control system. In certain embodiments, the flight control system may command operation of the propulsion assemblies responsive to onboard pilot flight control, remote flight control, autonomous flight control and/or combinations thereof.

In some embodiments, the fuselage may include a pod assembly that is selectively attachable to an airframe. In certain embodiments, the propulsion assemblies may include a plurality of first propulsion assemblies having proprotors that rotate clockwise and a plurality of second propulsion assemblies having proprotors that rotate counterclockwise. In some embodiments, the propulsion assemblies may include a plurality of first propulsion assemblies utilized in the forward flight mode and a plurality of second propulsion assemblies operable to be shut down in the forward flight mode. In such embodiments, the plurality of first propulsion assemblies may be outboard propulsion assemblies and the plurality of second propulsion assemblies may be inboard propulsion assemblies. Also, in such embodiments, the plurality of second propulsion assemblies may include proprotors having blades that are operable to be feathered and locked to prevent rotation in the forward flight mode and/or allowed to windmill in the forward flight mode. In certain embodiments, the plurality of propulsion assemblies may include a plurality of thrust vectoring propulsion assemblies.

In a second aspect, the present disclosure is directed to an aircraft having a vertical takeoff and landing flight mode and a forward flight mode. The aircraft includes an airframe, a pod assembly that is selectively attachable to the airframe and an X-tiltwing that is rotatable relative to the airframe between a vertical lift orientation and a forward thrust orientation. The X-tiltwing has oppositely disposed V-wing members each having first and second wing sections. In the vertical lift orientation, the first and second wing sections of each V-wing member are generally in the same horizontal plane. In the forward thrust orientation, the first and second wing sections of each V-wing member are generally in the same vertical plane. A distributed propulsion system is attached to the X-tiltwing such that a plurality of propulsion assemblies is attached to each wing section. A flight control system is operably associated with the distributed propulsion system to independently control each of the propulsion assemblies.

In some embodiments, the distributed propulsion system may include an electrical energy generation system including at least one internal combustion engine and an electric generator disposed within the airframe that is operable to provide electrical energy to at least one battery and/or an electric motor of each of the propulsion assemblies. In certain embodiments, the flight control system may be a redundant or triply redundant flight control system in communication with an electronics node of each propulsion assembly that is operable to control operations of the respective propulsion assembly responsive to onboard pilot flight control, remote flight control, autonomous flight control and/or combinations thereof. In some embodiments, the pod assembly may be a passenger pod assembly.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 1A-1F are schematic illustrations of an aircraft in accordance with embodiments of the present disclosure;

FIGS. 3A-3L are schematic illustrations of an aircraft in a sequential flight operating scenario in accordance with embodiments of the present disclosure;

FIGS. 5A-5B are schematic illustrations of an aircraft in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in the present disclosure. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1F:
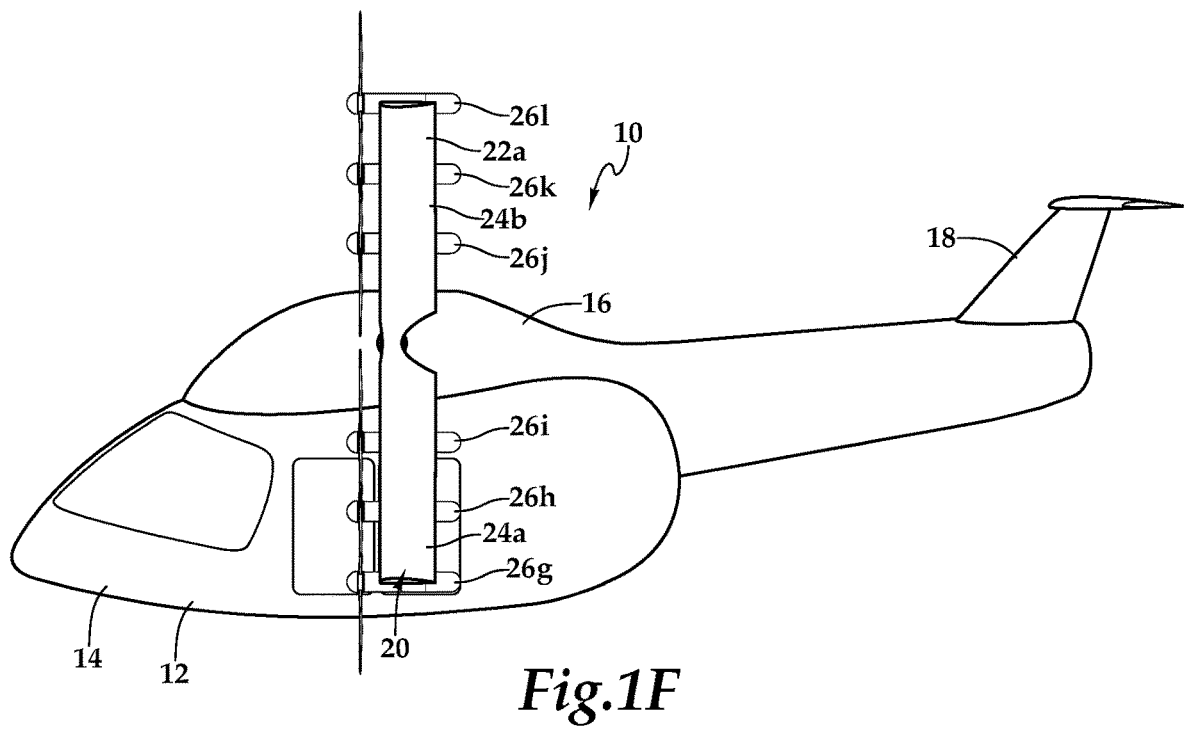
Figure 1E:
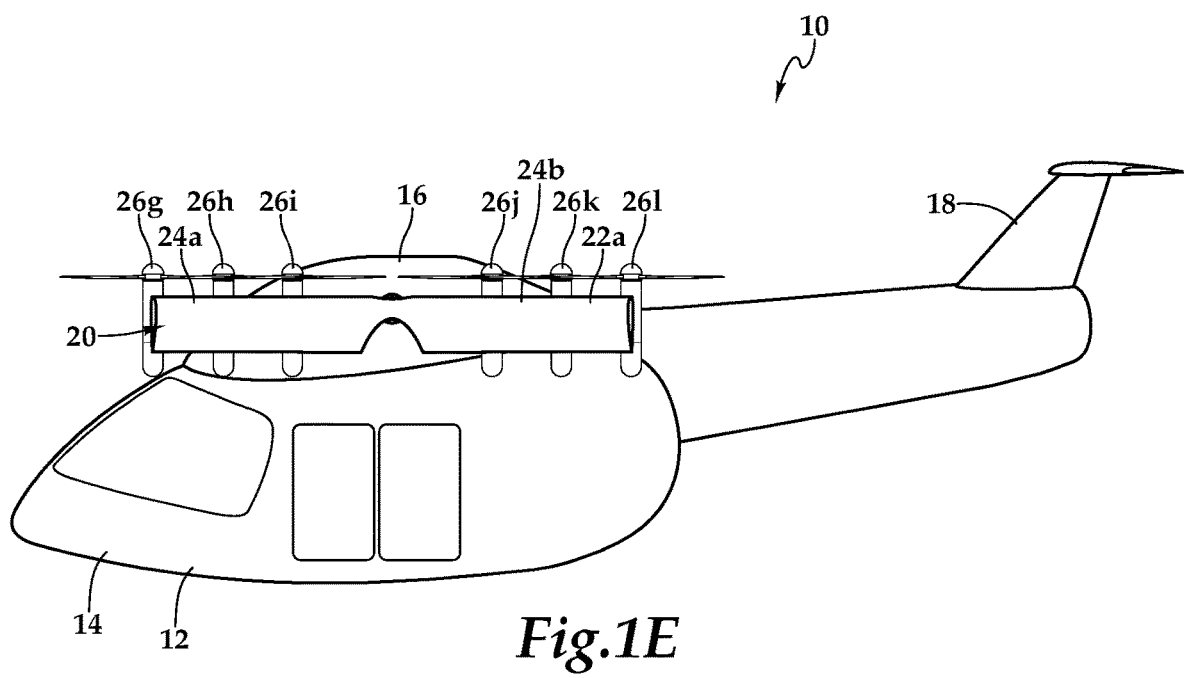

Referring to FIGS. 1A-1F in the drawings, various views of an aircraft 10 having an X-tiltwing are depicted. In the illustrated embodiment, aircraft 10 has a fuselage 12 depicted as a pod assembly 14 that is selectively coupled to an airframe 16. Airframe 16 has an empennage 18 that includes horizontal and vertical stabilizer such as one or more elevators and a rudder to aid in pitch and yaw stability of aircraft 10. In other embodiments, aircraft 10 may have an integral fuselage in which the passenger cabin is not separable from the airframe. Aircraft 10 includes an X-tiltwing 20 that is rotatable relative to airframe 16 between a vertical lift orientation, as best seen in FIGS. 1A, 1C, 1E and a forward thrust orientation, as best seen in FIGS. 1B, 1D, 1F. X-tiltwing 20 has oppositely disposed V-wing members 22a, 22b that are coupled to or integral with a shaft 22c that extends through an upper portion of airframe 16. An actuator (not visible) is operable to engage shaft 22c to enable X-tiltwing 20 to rotate relative to airframe 16 between the vertical lift orientation and the forward thrust orientation. V-wing member 22a has wing sections 24a, 24b and V-wing member 22b has wing sections 24c, 24d.

Each wing section 24a, 24b, 24c, 24d, has an airfoil cross-section that generates lift responsive to the forward airspeed of aircraft 10. X-tiltwing 20 is preferably formed from high strength and lightweight materials such as fiberglass fabric, carbon fabric, fiberglass tape, carbon tape and combinations thereof that may be formed by curing together a plurality of material layers. Wing sections 24a, 24b, 24c, 24d preferably include central passageways operable to contain communication lines such as electrical cables, data cables and the like. In the illustrated embodiment, a distributed propulsion system is coupled to X-tiltwing 20. The distributed propulsion system includes a plurality of interchangeable propulsion assemblies 26a-26l that are independently attachable to and detachable from X-tiltwing 20. As illustrated, the distributed propulsion system includes twelve independently operating propulsion assemblies 26a-26l. In other embodiments, however, the distributed propulsion system of aircraft 10 could have other numbers of independent propulsion assemblies including four, eight, sixteen or other suitable number of independent propulsion assemblies. As best seen in FIG. 1D, propulsion assemblies 26a-26c and 26g-26i are securely attached to X-tiltwing 20 in a high wing configuration and propulsion assemblies 26d-26f and 26*j*-26*l* are securably attached to X-tiltwing 20 in a low wing configuration by bolting or other suitable technique. In other embodiments, propulsion assemblies 26*a*-26*l* could be attached to X-tiltwing 20 in other configurations, including a mid wing configuration.

Propulsion assemblies 26*a*-26*l* are preferably standardized and interchangeable units that are most preferably line replaceable units enabling easy installation and removal from X-tiltwing 20. In addition, the use of line replaceable units is beneficial in maintenance situations if a fault is discovered with one of the propulsion assemblies. In this case, the faulty propulsion assembly can be decoupled from X-tiltwing 20 by simple operations such as unbolting structural members, disconnecting communication lines and other suitable procedures. Another propulsion assembly can then be attached to X-tiltwing 20 by coupling communication lines, bolting structural members together and other suitable procedures.

Figure 2:
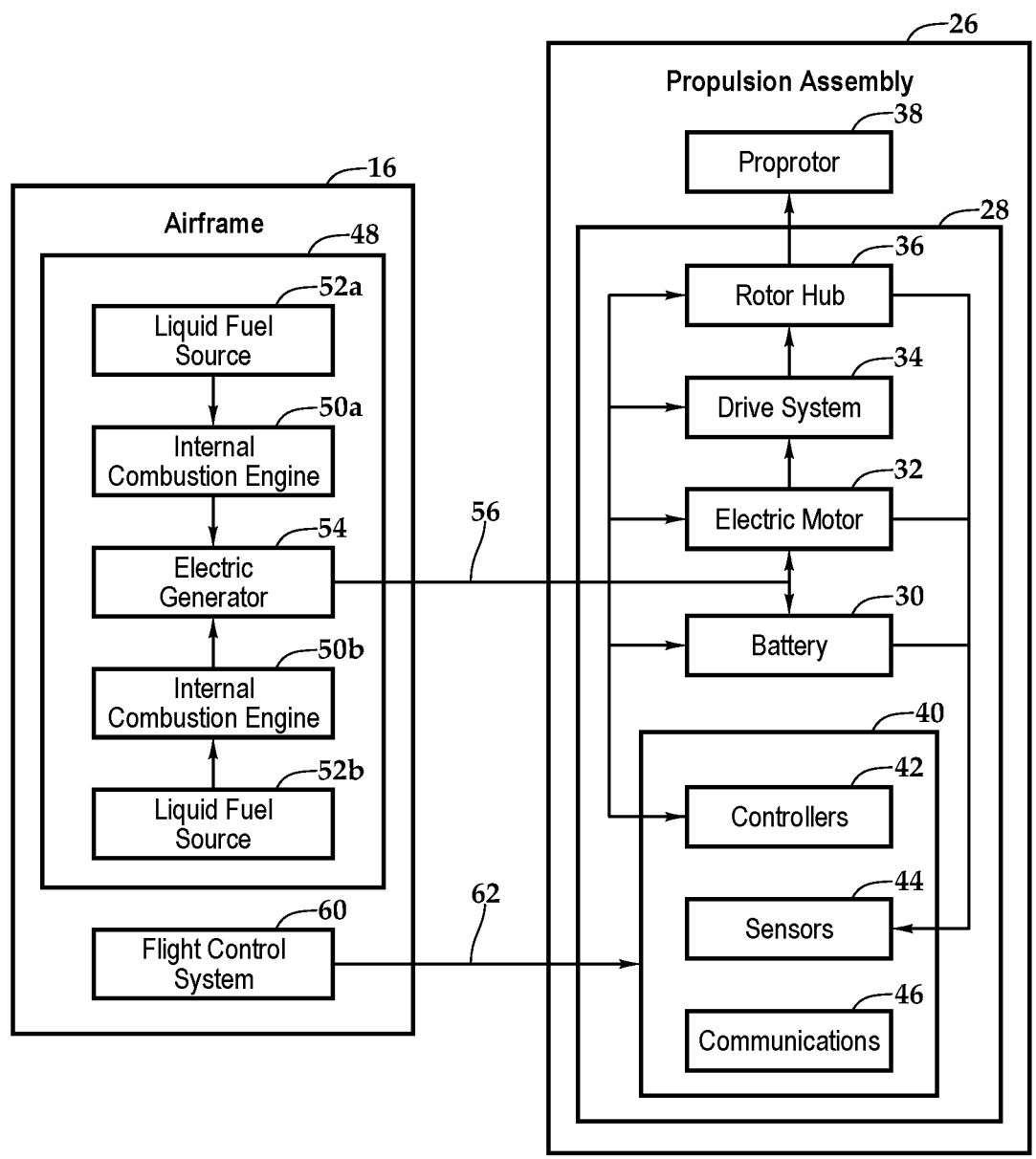
FIG. 2 is block diagram of the propulsion and control system for an aircraft in accordance with embodiments of the present disclosure.

As best seen in FIG. 2, each propulsion assembly 26 includes a nacelle 28 that houses one or more batteries 30, an electric motor 32, a drive system 34, a rotor hub 36 and an electronics node 40 including, for example, controllers 42, sensors 44 and communications elements 46 as well as other components suitable for use in the operation of a propulsion assembly. Each propulsion assembly 26 also includes a proprotor 38 having a plurality of proprotor blades that are securably attached to rotor hub 36. The blades are preferably operable for collective pitch control and may additional be operable for cyclic pitch control. As an alternative, the pitch of the blades may be fixed, in which case, thrust is determined by changes in the rotational velocity of the proprotors. Preferably, each propulsion assembly 26 is operable for independent thrust vectoring by, for example, tilting the plane of rotation of proprotor 38.

In the illustrated embodiment, aircraft 10 has a liquid fuel based electrical energy generation system 48 that is housed within airframe 16. Electrical energy generation system 48 preferably includes redundant internal combustion engines depicted as internal combustion engines 50*a*, 50*b*. Electrical energy generation system 48 also includes one or more fuel tanks depicted as liquid fuel sources 52*a*, 52*b*. In operation, one or both of internal combustion engines 50*a*, 50*b* are used to drive an electric generator 54 to produce electrical energy. This electrical energy is feed to propulsion assemblies 26 via communication lines 56 within X-tiltwing 20 to directly power electric motors 32 or for storage within batteries 30. This type of hybrid power system is beneficial as the energy density of liquid fuel exceeds that of batteries enabling greater endurance for aircraft 10.

In the illustrated embodiment, aircraft 10 has a flight control system 60 that is housed within airframe 16. Flight control system 60, such as a digital flight control system, is preferably a redundant flight control system and more preferably a triply redundant flight control system including three independent flight control computers. Use of triply redundant flight control system 60 improves the overall safety and reliability of aircraft 10 in the event of a failure in flight control system 60. Flight control system 60 preferably includes non-transitory computer readable storage media including a set of computer instructions executable by one or more processors for controlling the operation of the versatile propulsion system. Flight control system 60 may be implemented on one or more general-purpose computers, special purpose computers or other machines with memory and processing capability. For example, flight control system 60 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 60 may be a microprocessor-based system operable to execute program code in the form of machine-executable instructions. In addition, flight control system 60 may be selectively connectable to other computer systems via a proprietary encrypted network, a public encrypted network, the Internet or other suitable communication network that may include both wired and wireless connections.

Flight control system 60 communicates via a wired and/or wireless communications network 62 with the electronics nodes 40 of each propulsion assembly 26. Flight control system 60 receives sensor data from and sends flight command information to the electronics nodes 40 such that each propulsion assembly 26*a*-26*l* may be individually and independently controlled and operated. In both manned and unmanned missions, flight control system 60 may autonomously control some or all aspects of flight operation for aircraft 10. Flight control system 60 is also operable to communicate with one or more remote systems, via a wireless communications protocol. The remote system may be operable to receive flight data from and provide commands to flight control system 60 to enable remote flight control over some or all aspects of flight operation for aircraft 10, in both manned and unmanned missions. As depicted in FIGS. 1A-1F, aircraft 10 includes a pod assembly 14, illustrated as a passenger pod assembly, that is selectively attachable to airframe 16. Upon attachment, one or more communication channels may be established between pod assembly 14 and airframe 16. For example, a quick disconnect harness may be coupled between pod assembly 14 and airframe 16 to allow a pilot within pod assembly 14 to receive flight data from and provide commands to flight control system 60 to enable onboard pilot control over some or all aspects of flight operation for aircraft 10.

As best seen in FIG. 1A, aircraft 10 has a vertical takeoff and landing mode. As illustrated, X-tiltwing 20 is in its vertical lift configuration wherein wing sections 24*a*, 24*b* of V-wing member 22*a* and wing sections 24*c*, 24*d* of V-wing member 22*b* are disposed in generally the same horizontal plane while taking into account the attitude of aircraft 10. As noted, flight control system 60 independently controls and operates each propulsion assembly 26*a*-26*l*. In one example, flight control system 60 is operable to independently control collective pitch and adjust the thrust vector of each propulsion assembly 26*a*-26*l*, which can be beneficial in stabilizing aircraft 10 during vertical takeoff, vertical landing and hover. As best seen in FIG. 1B, aircraft 10 has a forward flight mode. As illustrated, X-tiltwing 20 is in its forward thrust configuration wherein wing sections 24*a*, 24*b* of V-wing member 22*a* and wing sections 24*c*, 24*d* of V-wing member 22*b* are disposed in generally the same vertical plane while taking into account the attitude of aircraft 10. In the illustrated embodiment, the proprotor blades of propulsion assemblies 26*a*-26*f* rotate counterclockwise while the proprotor blades of propulsion assemblies 26*g*-26*l* rotate clockwise to balance the torque of aircraft 10. In other embodiments, propulsion assembly 26*a*-26*l* may rotate in other configurations.

Figure 3C:
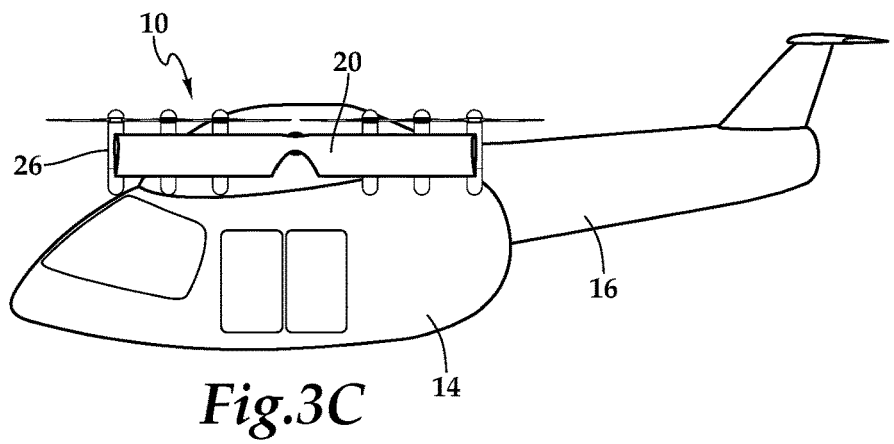
Figure 3B:
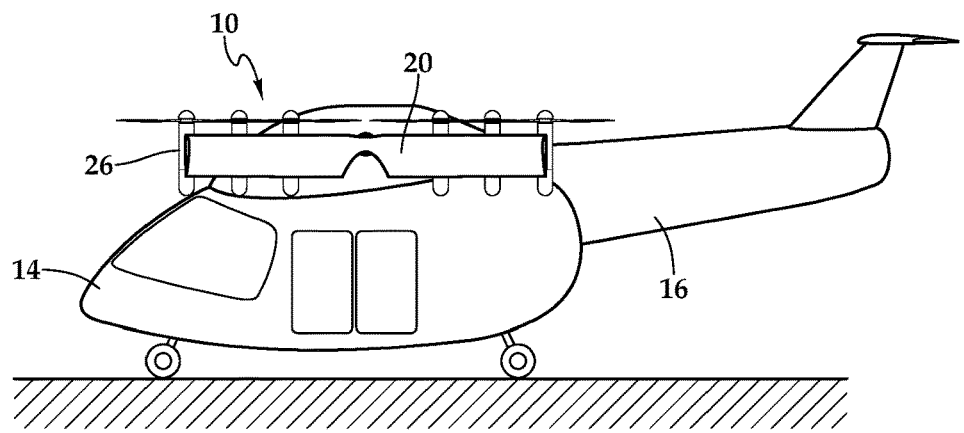
Figure 3A:
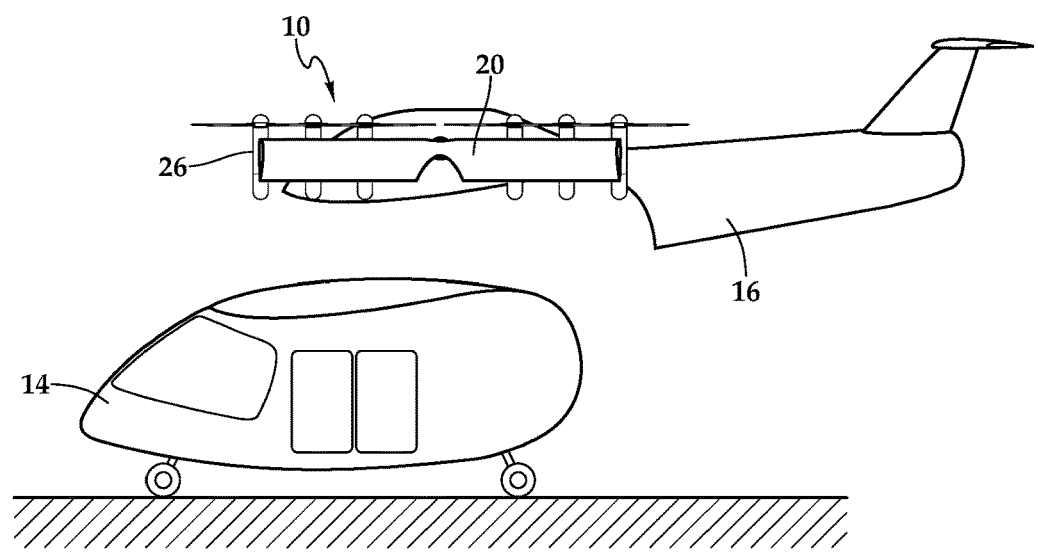

Referring next to FIGS. 3A-3I in the drawings, a sequential flight-operating scenario of aircraft 10 is depicted. As discussed herein, passenger pod assembly 14 is selectively attachable to airframe 16 such that a single airframe can be operably coupled to and decoupled from numerous passenger pod assemblies for numerous missions over time. As best seen in FIG. 3A, pod assembly 14 is positioned on a surface at a current location such as at the home of a pod assembly owner, at a business utilizing pod assembly transportation, in a military theater, on the flight deck of an aircraft carrier or other location. In the illustrated embodiment, pod assembly 14 includes retractable wheels that enable ground transportation of pod assembly 14. As illustrated, airframe 16 is currently in an approach pattern near pod assembly 14 with X-tiltwing 20 in the vertical lift orientation and with all propulsion assemblies 26 operating. In one example, airframe 16 may have been dispatched from a transportation services provider to retrieve and transport pod assembly 14 from the current location to a destination. Airframe 16 may be operated responsive to autonomous flight control based upon a flight plan preprogrammed into flight control system 60 of airframe 16 or may be operated responsive to remote flight control. In either case, airframe 16 is operable to identify the current location of pod assembly 14 using, for example, global positioning system information or other location based system information.

As best seen in FIG. 3B, airframe 16 has completed its approach and has engaged pod assembly 14 to create a mechanical coupling and a communication channel therebetween. X-tiltwing 20 remains in the vertical lift orientation and with all propulsion assemblies 26 operating. As best seen in FIG. 3C, pod assembly 14 has retracted its wheels and is fully supported by airframe 16 in hover or vertical flight. X-tiltwing 20 remains in the vertical lift orientation and with all propulsion assemblies 26 operating. Once pod assembly 14 is attached to airframe 16, the flight control system of airframe 16 may be responsive to autonomous flight control, remote flight control, onboard pilot flight control or any combination thereof. For example, it may be desirable to utilize onboard pilot flight control during certain maneuvers such as takeoff and landing but rely on remote or autonomous flight control during hover, forward flight and/or transitions between forward flight and VTOL operations.

Figure 4B:
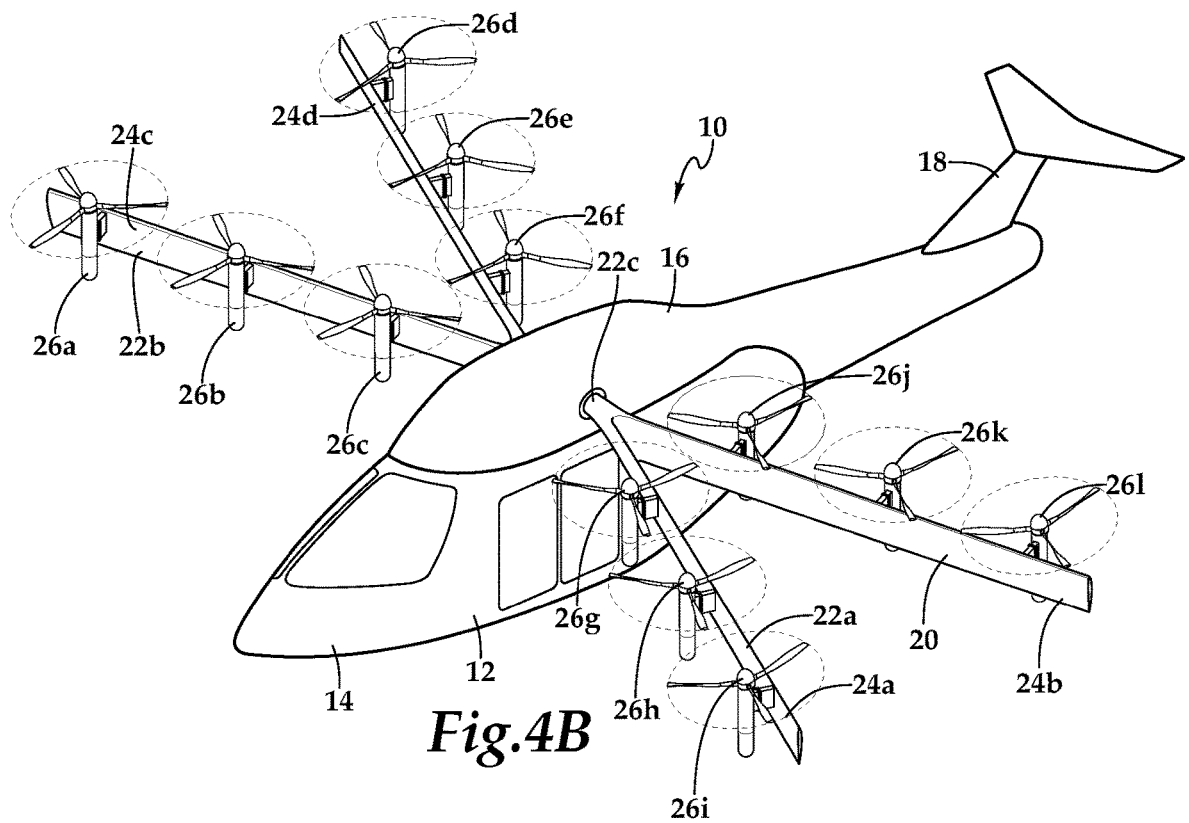
FIGS. 4A-4B are schematic illustrations of an aircraft in accordance with embodiments of the present disclosure.
Figure 4A:
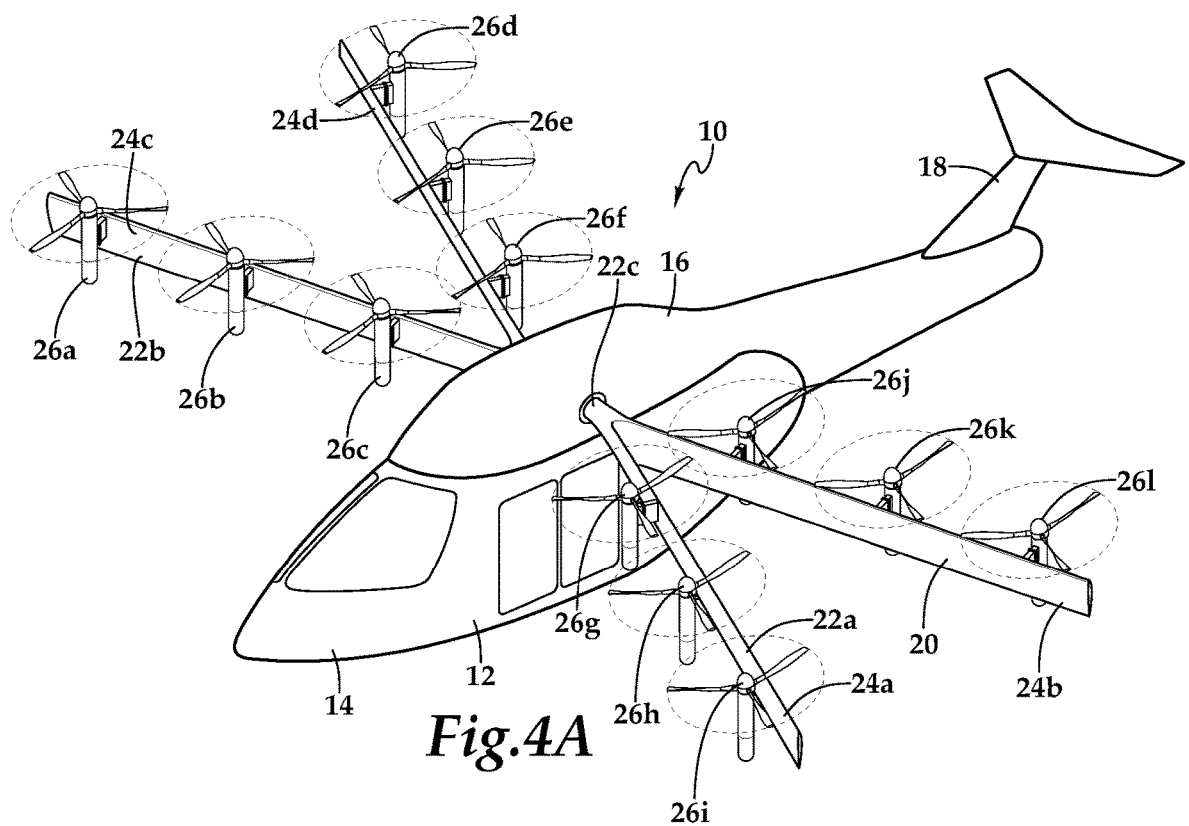

Regardless of the chosen flight control mode, each of the propulsion assemblies is independently controllable during flight operations. For example, to aid in stabilization during hover including pitch, roll and yaw control as well as to perform lateral and fore/aft maneuvers, it may be desirable to adjust the thrust vector of one or more of the propulsion assemblies. As best seen in FIG. 4A, the thrust vectors of each of the propulsion assemblies 26a-26l has been adjusted by tilting the plane of rotation of each proprotor by approximately ten degrees. The illustrated thrust vector adjustments may provide hover stabilization relative to a crosswind or lateral thrust for a desired maneuver. Preferably, each proprotor is tiltable in any direction thus enabling resolution of the thrust vector within a thrust vector cone relative to a centerline axis. In some embodiments, the thrust vector cone may have a maximum angle relative to the centerline axis of between about ten degrees and about thirty degrees. In other embodiments, the thrust vector cone may have a maximum angle relative to the centerline axis of between about fifteen degrees and about twenty-five degrees. In additional embodiments, the thrust vector cone may have a maximum angle relative to the centerline axis of about twenty degrees. In another example, as best seen in FIG. 4B, the thrust vectors of just the outboard propulsion assemblies 26a, 26d, 26i, 26l has been adjusted by approximately ten degrees. Again, the illustrated thrust vector adjustments may provide hover stabilization relative to a crosswind or lateral thrust for a desired maneuver. As should be apparent to those having ordinary skill in the art, the thrust vectors of any one or more of the propulsion assemblies 26a-26l may be adjusted between zero degrees and the maximum angle to achieved a desired outcome.

After vertical assent to the desired elevation, aircraft 10 may begin the transition from vertical takeoff to forward flight. As best seen in FIGS. 3C-3F, as aircraft 10 transitions from vertical takeoff and landing mode to forward flight mode, X-tiltwing 20 rotates relative to airframe 16 maintaining pod assembly 14 in a generally horizontal attitude for the safety and comfort of passengers, crew and/or cargo carried in pod assembly 14. In the illustrated embodiment, this is enabled by a single actuator rotating the shaft extending between the V-wing members of X-tiltwing 20. In other embodiments, the rotation of each of the V-wing members of X-tiltwing 20 may be independent and/or may be controlled by multiple actuators.

Once aircraft 10 has completed the transition to forward flight mode, certain of the propulsion assemblies may be shut down as the thrust requirements in forward flight mode are reduced compared to the thrust requirements of vertical takeoff and landing mode. For example, as best seen in FIG. 5A, inboard propulsion assemblies 26b-26c, 26e-26h, 26j-26k having been shut down. In the illustrated embodiment, the blades of the shut down proprotors have been feathered and the rotor hubs have been locked to prevent rotation of the proprotors, thereby reducing drag. In another example, as best seen in FIG. 5B, inboard propulsion assemblies 26b-26c, 26e-26h, 26j-26k having also been shut down. In this case, the blades of the proprotors have been feathered but the rotor hubs have not been locked, which allows the proprotors to windmill, reducing drag.

Figure 3J:
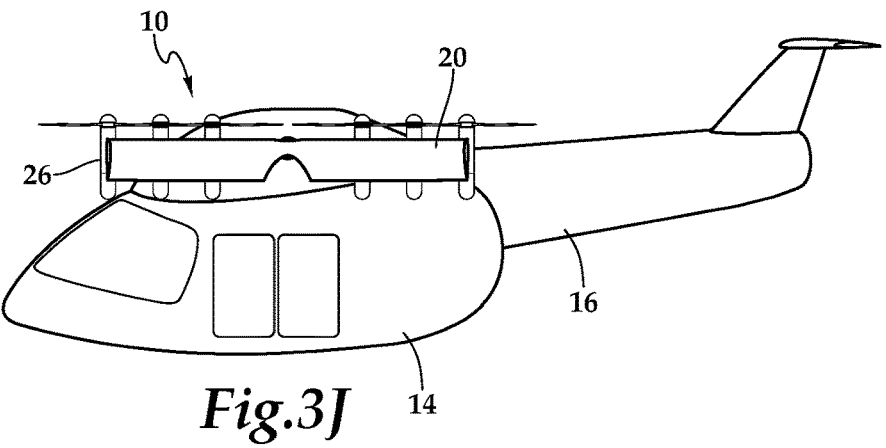
Figure 3K:
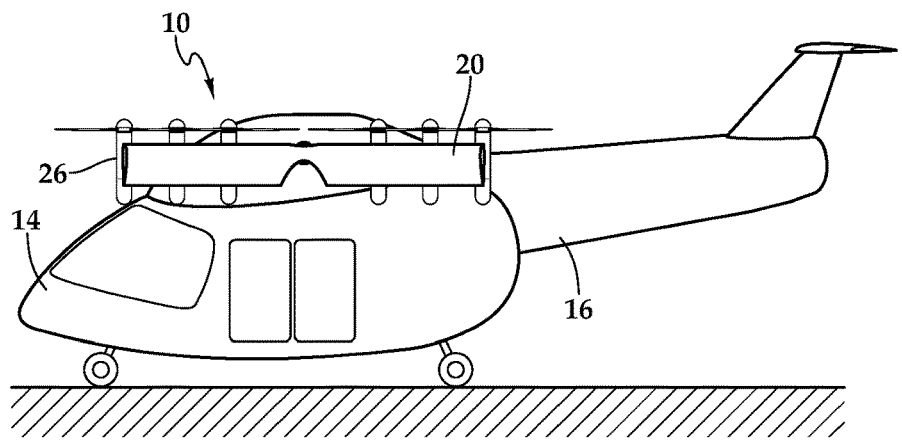
Figure 3L:
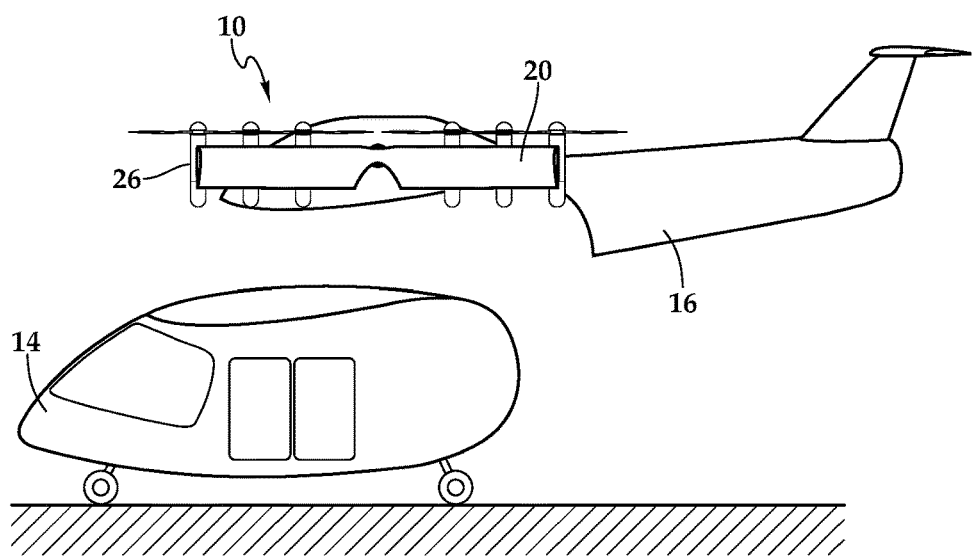

When aircraft 10 begins its approaches to the destination, inboard propulsion assemblies 26b-26c, 26e-26h, 26j-26k are reengaged to provide full propulsion capabilities, as best seen in FIG. 3G. Aircraft 10 may now begin its transition from forward flight mode to vertical takeoff and landing mode. As best seen in FIGS. 3G-3J, during the transition from forward flight mode to vertical takeoff and landing flight mode, X-tiltwing 20 rotates relative to airframe 16 maintaining pod assembly 14 in a generally horizontal attitude for the safety and comfort of passengers, crew and/or cargo carried in pod assembly 14. Once aircraft 10 has completed the transition to vertical takeoff and landing flight mode, as best seen in FIG. 3J, aircraft 10 may commence its vertical descent to a surface at the destination location such as the home of a pod assembly owner, at a business utilizing pod assembly transportation, in a military theater, on the flight deck of an aircraft carrier or other location. As best seen in FIG. 3K, pod assembly 14 has deployed its landing gear and is resting on the surface. Aircraft 10 may now engage in ground maneuvers, if desired. Upon completion of any ground maneuvers, airframe 16 may decouple from pod assembly 14 and depart from the destination for another location, as best seen in FIG. 3L.

Figure 6A:
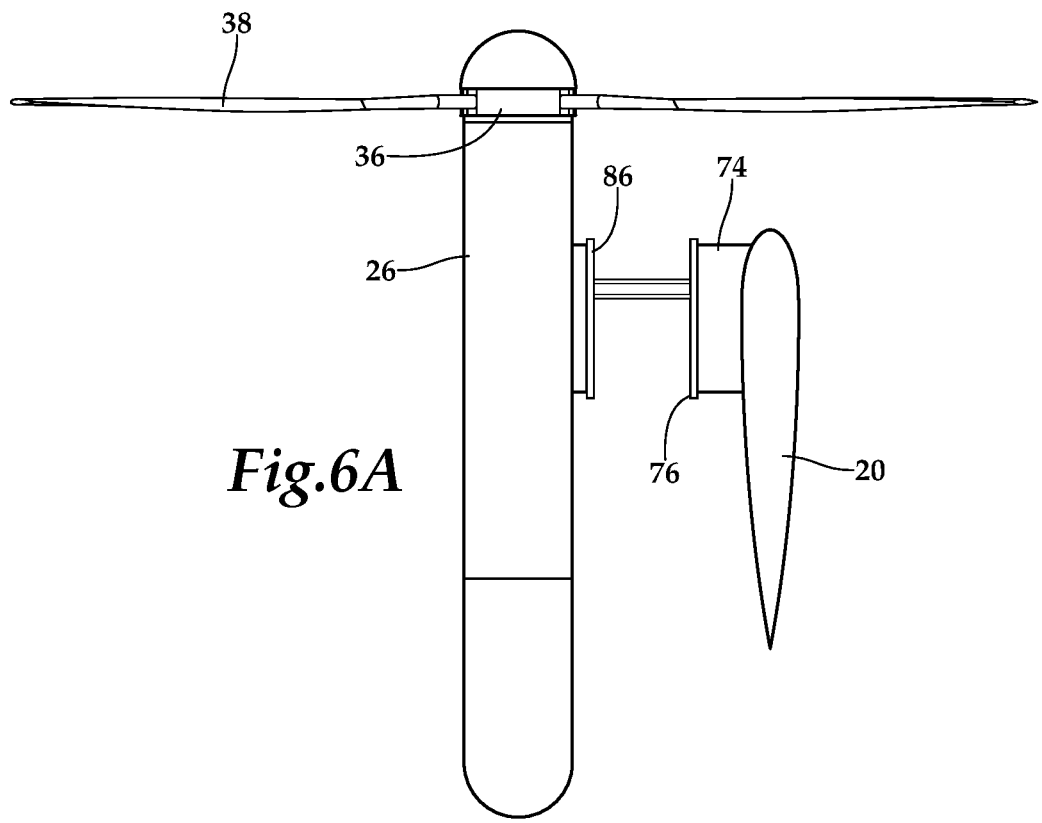
FIGS. 6A-6C are various views depicting the connections between a propulsion assembly and an X-tiltwing of an aircraft in accordance with embodiments of the present disclosure.
Figure 6B:
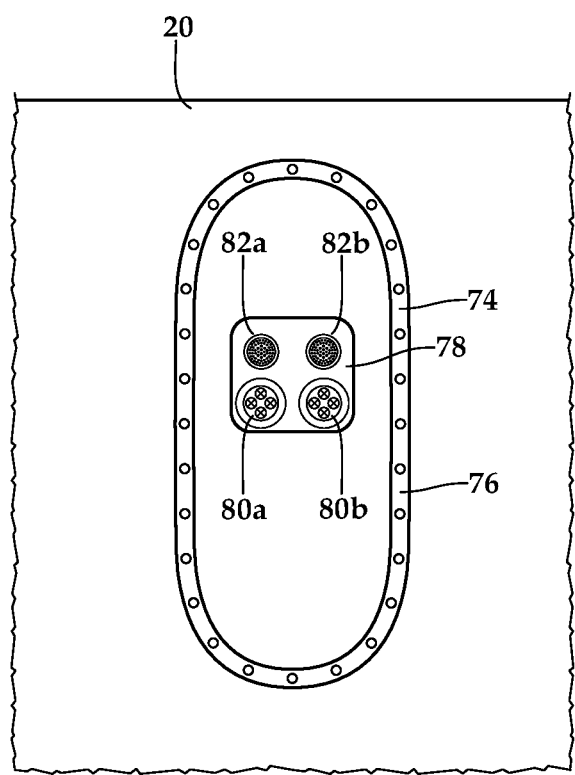
Figure 6C:
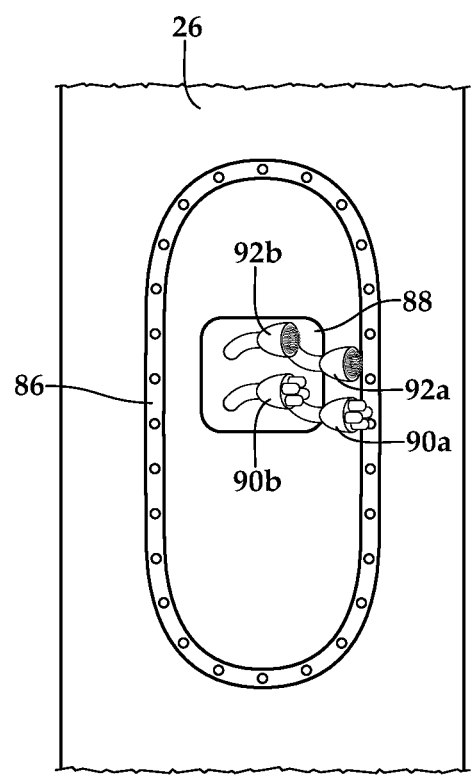

Referring to FIGS. 6A-6C in the drawings, the connections between a propulsion assembly 26 and X-tiltwing 20 will now be discussed. As discussed herein, each propulsion assembly 26 is an element of the distributed propulsion system wherein, the propulsion assemblies are interchangeably attachable to X-tiltwing 20 as line replaceable units. X-tiltwing 20 includes a plurality of stanchions, such as stanchion 74, that provide standoff between propulsion assembly 26 and X-tiltwing 20. By providing standoff between propulsion assemblies 26 and X-tiltwing 20, the aerodynamics of aircraft 10 are improved by effectively creating more wing surface to provide lift during various flight maneuvers as compared to a mid wing implementation. Stanchion 74 includes a flange 76 having a bolt pattern. As best seen in FIG. 6B, stanchion 74 includes an interface panel 78 depicted with two power sockets 80a, 80b and two data or communication sockets 82a, 82b. As illustrated, sockets 80a, 80b, 82a, 82b are substantially flush or integrated with panel 78. As should be apparent to those having ordinary skill in the art, each stanchion of the present disclosure will include a similar panel with similar sockets. In addition, even though a particular arrangement of sockets has been depicted and described, those having ordinary skill in the art should understand that the stanchions of the present disclosure could have other numbers of sockets in other arrangements.

Each propulsion assembly 26 includes a flange 86, as best seen in FIG. 6C. Each flange 86 has a bolt pattern that matches the bolt pattern of flanges 76 such that propulsion assemblies 26 can be interchangeably bolted to any one of the stanchions 74 to create a mechanical connection therebetween. Each propulsion assembly 26 includes an interface panel 88 depicted with two power cables 90a, 90b and two data or communication cables 92a, 92b. Power cables 90a, 90b are operable to couple with power sockets 80a, 80b to established electrical connections between airframe 16 and propulsion assembly 26. For example, these connections enable electrical power from electrical energy generation system 48 of airframe 16 to be provided to components within propulsion assembly 26 such as electronics node 40, electric motor 32, battery 30 and/or other electrical components.

Communication cables 92a, 92b are operable to couple with communication sockets 82a, 82b to established data communication between airframe 16 and propulsion assembly 26. For example, these connections enable flight control system 60 to communicate with electronics node 40 to provide command and control information to propulsion assembly 26 and receive sensor and feedback information from propulsion assembly 26. As should be apparent to those having ordinary skill in the art, each propulsion assembly of the present disclosure will include a similar panel with similar cables. In addition, even though a particular arrangement of cables has been depicted and described, those having ordinary skill in the art should understand that the propulsion assemblies of the present disclosure could have other numbers of cables in other arrangements that preferably mate with corresponding sockets of the stanchions of the present disclosure.

Figure 7:
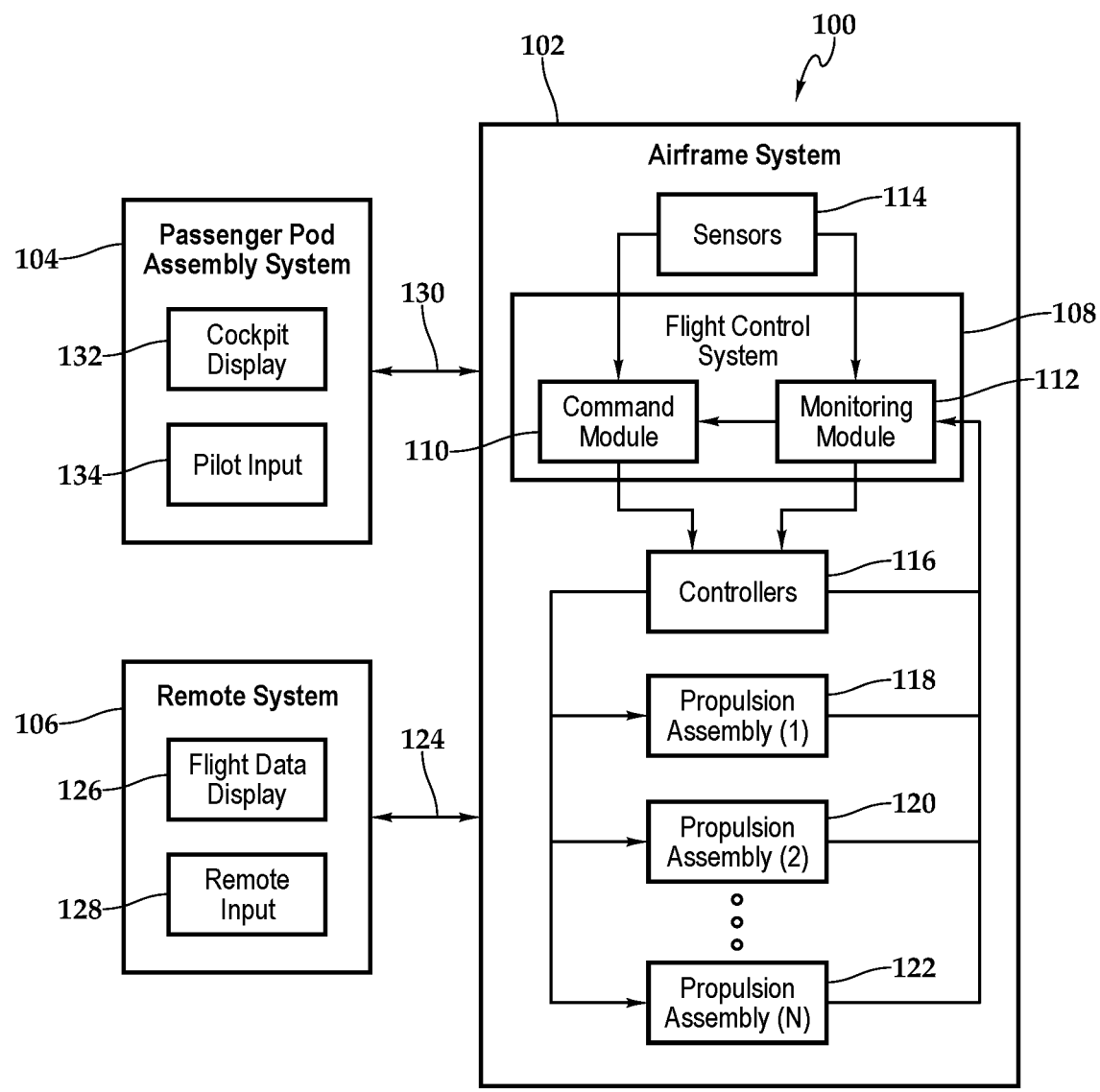
FIG. 7 is a block diagram of an aircraft control system in accordance with embodiments of the present disclosure.

Referring additionally to FIG. 7 in the drawings, a block diagram depicts an aircraft control system 100 operable for use with aircraft 10 of the present disclosure. In the illustrated embodiment, system 100 includes three primary computer based subsystems; namely, an airframe system 102, a passenger pod assembly system 104 and a remote system 106. As discussed herein, the aircraft of the present disclosure may be operated autonomously responsive to commands generated by flight control system 108 that preferably includes a non-transitory computer readable storage medium including a set of computer instructions executable by a processor. Flight control system 108 may be a triply redundant system implemented on one or more general-purpose computers, special purpose computers or other machines with memory and processing capability. For example, flight control system 108 may include one or more memory storage modules including, but is not limited to, internal storage memory such as random access memory, non-volatile memory such as read only memory, removable memory such as magnetic storage memory, optical storage, solid-state storage memory or other suitable memory storage entity. Flight control system 108 may be a microprocessor-based system operable to execute program code in the form of machine-executable instructions. In addition, flight control system 108 may be selectively connectable to other computer systems via a proprietary encrypted network, a public encrypted network, the Internet or other suitable communication network that may include both wired and wireless connections.

In the illustrated embodiment, flight control system 108 includes a command module 110 and a monitoring module 112. It is to be understood by those skilled in the art that these and other modules executed by flight control system 108 may be implemented in a variety of forms including hardware, software, firmware, special purpose processors and combinations thereof. Flight control system 108 receives input from a variety of sources including internal sources such as sensors 114, controllers 116 and propulsion assemblies 118-122, and external sources such as passenger pod assembly system 104, remote system 106 as well as global positioning system satellites or other location positioning systems and the like. For example, flight control system 108 may receive a flight plan including starting and ending locations for a mission from passenger pod assembly system 104 and/or remote system 106. Thereafter, flight control system 108 is operable to autonomously control all aspects of flight of an aircraft of the present disclosure.

For example, during the various operating modes of aircraft 10 including vertical takeoff and landing flight mode, hover flight mode, forward flight mode and transitions therebetween, command module 110 provides commands to controllers 116. These commands enable independent operation of each propulsion assembly 118-122 including, for example, rotating the proprotors, changing the pitch of the proprotor blades, adjusting the thrust vector generated by the proprotor and the like. Flight control system 108 receives feedback from controllers 116 and each propulsion assembly 118-122. This feedback is processes by monitoring module 112 that can supply correction data and other information to command module 110 and/or controllers 116. Sensors 114, such as positioning sensors, attitude sensors, speed sensors, environmental sensors, fuel sensors, temperature sensors, location sensors and the like also provide information to flight control system 108 to further enhance autonomous control capabilities.

Some or all of the autonomous control capability of flight control system 108 can be augmented or supplanted by a remote flight control system 106. Remote system 106 may include one or computing systems that may be implemented on general-purpose computers, special purpose computers or other machines with memory and processing capability. For example, the computing systems may include one or more memory storage modules including, but is not limited to, internal storage memory such as random access memory, non-volatile memory such as read only memory, removable memory such as magnetic storage memory, optical storage memory, solid-state storage memory or other suitable memory storage entity. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. The communication network may be a local area network, a wide area network, the Internet, or any other type of network that couples a plurality of computers to enable various modes of communication via network messages using as suitable communication techniques, such as transmission control protocol/internet protocol, file transfer protocol, hypertext transfer protocol, internet protocol security protocol, point-to-point tunneling protocol, secure sockets layer protocol or other suitable protocol. Remote system 106 communicates with flight control system 108 via a communication link 124 that may include both wired and wireless connections.

Remote system 106 preferably includes one or more flight data display devices 126 configured to display information relating to one or more aircraft of the present disclosure. Display devices 126 may be configured in any suitable form, including, for example, liquid crystal displays, light emitting diode displays, cathode ray tube displays or any suitable type of display. Remote system 106 may also include audio output and input devices such as a microphone, speakers and/or an audio port allowing an operator to communicate with, for example, a pilot on board a pod assembly. The display device 126 may also serve as a remote input device 128 if a touch screen display implementation is used, however, other remote input devices, such as a keyboard or joysticks, may alternatively be used to allow an operator to provide control commands to an aircraft being operated responsive to remote control.

Some or all of the autonomous and/or remote flight control of an aircraft of the present disclosure can be augmented or supplanted by onboard pilot flight control from an attached passenger pod assembly including system 104. Passenger pod assembly system 104 preferably includes a non-transitory computer readable storage medium including a set of computer instructions executable by a processor and may be implemented by a general-purpose computer, a special purpose computer or other machine with memory and processing capability. Passenger pod assembly system 104 may include one or more memory storage modules including, but is not limited to, internal storage memory such as random access memory, non-volatile memory such as read only memory, removable memory such as magnetic storage memory, optical storage memory, solid-state storage memory or other suitable memory storage entity. Passenger pod assembly system 104 may be a microprocessor-based system operable to execute program code in the form of machine-executable instructions. In addition, passenger pod assembly system 104 may be connectable to other computer systems via a proprietary encrypted network, a public encrypted network, the Internet or other suitable communication network that may include both wired and wireless connections. Passenger pod assembly system 104 communicates with flight control system 108 via a communication channel 130 that preferably includes a wired connection.

Passenger pod assembly system 104 preferably includes a cockpit display device 132 configured to display information to an onboard pilot. Cockpit display device 132 may be configured in any suitable form, including, for example, as one or more display screens such as liquid crystal displays, light emitting diode displays and the like or any other suitable display type including, for example, a display panel, a dashboard display, an augmented reality display or the like. Passenger pod assembly system 104 may also include audio output and input devices such as a microphone, speakers and/or an audio port allowing an onboard pilot to communicate with, for example, an operator of a remote system. Cockpit display device 132 may also serve as a pilot input device 134 if a touch screen display implementation is used, however, other user interface devices may alternatively be used to allow an onboard pilot to provide control commands to an aircraft being operated responsive to onboard pilot control including, for example, a control panel, mechanical control devices or other control devices. As should be apparent to those having ordinarily skill in the art, through the use of system 100, an aircraft of the present disclosure can be operated responsive to a flight control protocol including autonomous flight control, remote flight control or onboard pilot flight control and combinations thereof.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. An aircraft having a vertical takeoff and landing flight mode and a forward flight mode, the aircraft comprising:
   a fuselage;
   an X-tiltwing rotatable relative to the fuselage between a vertical lift orientation and a forward thrust orientation, the X-tiltwing having oppositely disposed V-wing members each having first and second wing sections;
   a distributed propulsion system attached to the X-tiltwing, the distributed propulsion system including a plurality of propulsion assemblies attached to each wing section; and
   a flight control system operably associated with the distributed propulsion system and operable to independently control each of the propulsion assemblies;
   wherein, in the vertical lift orientation, the first and second wing sections of each V-wing member are in the same horizontal plane; and
   wherein, in the forward thrust orientation, the first and second wing sections of each V-wing member are in the same vertical plane.

2. The aircraft as recited in claim 1 wherein each of the propulsion assemblies further comprises:
   a nacelle operable to be coupled to the X-tiltwing;
   an electric motor disposed within the nacelle;
   a rotor hub mechanically coupled to the electric motor and operable to rotate responsive to operation of the electric motor; and
   a proprotor mechanically coupled to the rotor hub and operable to rotate therewith.

3. The aircraft as recited in claim 2 further comprising an electrical energy generation system disposed within the fuselage operable to provide electrical energy to each of the propulsion assemblies.

4. The aircraft as recited in claim 3 wherein the electrical energy generation system further comprise at least one internal combustion engine and an electric generator.

5. The aircraft as recited in claim 3 wherein each of the propulsion assemblies further comprises at least one battery disposed within the nacelle and wherein the electrical energy provided by the electrical energy generation system charges the batteries.

6. The aircraft as recited in claim 1 wherein each of the propulsion assemblies further comprises a line replaceable unit.

7. The aircraft as recited in claim 1 wherein each of the propulsion assemblies further comprises an electronics node in communication with the flight control system, each of the electronics nodes operable to control operations of the respective propulsion assembly.

8. The aircraft as recited in claim 1 wherein the flight control system further comprises at least one of a redundant flight control system and a triply redundant flight control system.

9. The aircraft as recited in claim 1 wherein the flight control system commands operation of the propulsion assemblies responsive to at least one of onboard pilot flight control, remote flight control, autonomous flight control and combinations thereof.

10. The aircraft as recited in claim 1 wherein the fuselage further comprising a pod assembly selectively attachable to an airframe.

11. The aircraft as recited in claim 1 wherein the plurality of propulsion assemblies further comprises a plurality of first propulsion assemblies having proprotors that rotate clockwise and a plurality of second propulsion assemblies having proprotors that rotate counterclockwise.

12. The aircraft as recited in claim 1 wherein the plurality of propulsion assemblies further comprises a plurality of first propulsion assemblies utilized in the forward flight mode and a plurality of second propulsion assemblies operable to be shut down in the forward flight mode.

13. The aircraft as recited in claim 12 wherein the plurality of first propulsion assemblies further comprises outboard propulsion assemblies and the plurality of second propulsion assemblies further comprises inboard propulsion assemblies.

14. The aircraft as recited in claim 12 wherein the plurality of second propulsion assemblies further comprises proprotors having blades that are operable to be feathered and locked to prevent rotation in the forward flight mode.

15. The aircraft as recited in claim 12 wherein the plurality of second propulsion assemblies further comprises proprotors having blades that are operable to be feathered and allowed to windmill in the forward flight mode.

16. The aircraft as recited in claim 1 wherein the plurality of propulsion assemblies further comprises a plurality of thrust vectoring propulsion assemblies.

17. An aircraft having a vertical takeoff and landing flight mode and a forward flight mode, the aircraft comprising:
an airframe;
a pod assembly selectively attachable to the airframe;
an X-tiltwing rotatable relative to the airframe between a vertical lift orientation and a forward thrust orientation, the X-tiltwing having oppositely disposed V-wing members each having first and second wing sections;
a distributed propulsion system attached to the X-tiltwing, the distributed propulsion system including a plurality of propulsion assemblies attached to each wing section; and
a flight control system operably associated with the distributed propulsion system and operable to independently control each of the propulsion assemblies;
wherein, in the vertical lift orientation, the first and second wing sections of each V-wing member are in the same horizontal plane; and
wherein, in the forward thrust orientation, the first and second wing sections of each V-wing member are in the same vertical plane.

18. The aircraft as recited in claim 17 wherein the distributed propulsion system further comprises an electrical energy generation system including at least one internal combustion engine and an electric generator disposed within the airframe operable to provide electrical energy to each of the propulsion assemblies and wherein each of the propulsion assemblies further comprises an electrically system including at least one battery and an electric motor.

19. The aircraft as recited in claim 17 wherein the flight control system further comprises at least one of a redundant flight control system and a triply redundant flight control system;
wherein each of the propulsion assemblies further comprises an electronics node in communication with the flight control system and each of the electronics nodes is operable to control operations of the respective propulsion assembly; and
wherein the flight control system commands operation of the propulsion assemblies responsive to at least one of onboard pilot flight control, remote flight control, autonomous flight control and combinations thereof.

20. The aircraft as recited in claim 17 wherein the pod assembly further comprises a passenger pod assembly.

* * * * *

UNITED STATES PATENT AND TRADEMARK OFFICE
CERTIFICATE OF CORRECTION

PATENT NO.       : 10,513,334 B2
APPLICATION NO.  : 15/619765
DATED            : December 24, 2019
INVENTOR(S)      : Groninga et al.

It is certified that error appears in the above-identified patent and that said Letters Patent is hereby corrected as shown below:

In the Specification

Column 8, Line 4:
"achieved a desired outcome."
Should read:
--achieve a desired outcome.--

In the Claims

Column 14, Line 30 Claim 18:
"sion assemblies further comprises an electrically system"
Should read:
--sion assemblies further comprises an electrical system--

Signed and Sealed this
Twenty-eighth Day of January, 2020

Andrei Iancu
*Director of the United States Patent and Trademark Office*